United States Patent [19]

Johnson et al.

[11] Patent Number: 4,781,741
[45] Date of Patent: Nov. 1, 1988

[54] PROCESS FOR PRODUCING SPHERICAL GLASS PARTICLES

[75] Inventors: Walter A. Johnson, Towanda; Nelson E. Kopatz; Lori S. Pruyne, both of Sayre, all of Pa.

[73] Assignee: GTE Products Corporation, Stamford, Conn.

[21] Appl. No.: 103,617

[22] Filed: Sep. 28, 1987

Related U.S. Application Data

[63] Continuation of Ser. No. 871,039, Jun. 5, 1986, abandoned.

[51] Int. Cl.$^4$ .............................................. C03B 19/10
[52] U.S. Cl. ...................................... 65/21.2; 65/21.3; 264/15
[58] Field of Search ...................... 65/21.2, 141, 21.3, 65/142; 264/5, 11, 15

[56] References Cited

U.S. PATENT DOCUMENTS

| | | | |
|---|---|---|---|
| 1,051,627 | 1/1913 | Passow | 65/10 |
| 3,104,164 | 9/1963 | Osborn | 65/21.2 X |
| 3,597,176 | 8/1971 | Plumat | 65/21.2 |

*Primary Examiner*—Robert L. Lindsay
*Attorney, Agent, or Firm*—Donald R. Castle

[57] ABSTRACT

A process is disclosed for producing spherical glass particles. The process involves forming a high velocity stream of molten droplets of glass, directing said stream toward a repellent surface, impacting the molten droplets against the surface to form fragmented portions, and cooling the fragmented portions to form a glass powder consisting essentially of particles the major portion of which are glass spheres.

5 Claims, No Drawings

PROCESS FOR PRODUCING SPHERICAL GLASS PARTICLES

This application is a continuation of application Ser. No. 871,039, filed 6/5/86, now abandoned.

BACKGROUND OF THE INVENTION

This invention relates to a process for producing spherical glass particles.

Glass spheres of relatively small particle size have found use in a wide range of applications such as in electronics and injection molding of plastics.

U.S. Pat. No. 4,435,342 relates to a process in which fine particles are produced by fine molten stream onto a rotating surface which discharges molten droplets against another surface. The particles striking the latter surface are subdivided and collected as ultrafine particles.

U.S. Pat. No. 4,069,045 describes a process wherein a jet of molten metal is impinged against a rotating flat disc. Relatively thin, brittle, easily shattered, and essentially dendrite-free metal flakes are obtained. These flakes are also described in U.S. Pat. No. 4,063,942.

U.S. Pat. No. 4,221,587 relates to a method of making powder by impinging a jet of molten alloy at an acute angle against the inner surface of a rotating cylindrical chill body. As set forth in column 5, the impinging molten material breaks into a stream of discrete droplets which bounce off the surface and move in the direction of the chill surface. Upon impact with the chill surface, the droplets are solidified at a rapid rate. As set forth in column 6, "the glassy metal powder particles . . . have relatively sharp notched edges which enable the particles to interlock during compaction." As set forth in the first example, the particle size of the powder is such that 90% of the particles have a particle size range between about 25 and 300 microns. In the second example, the particle size of the powder ranges between 100 and 1000 microns.

Herbert Herman and Hareesh Bhat, in an article entitled "Metastable Phases Produced by Plasma Spraying" appearing in the proceedings of a symposium sponsored by the TMS-AIME alloy Phases Committee at the Fall meeting of the Metallurgical Society of AIME, Pittsburg, Pa, Oct. 5–9, 1980 describes the high velocity deposition of plasma-melting particles on a substrate. On page 118, the article indicates that good physical and thermal contact should exist between the solidifying liquid and substrate. Liquid spreading occurs away from the impact point. As illustrated in the drawings, the particles have a flat surface adjacent the substrate with a central raised core region and a circular rim area.

U.S. Pat. Nos. 4,076,640, 4,191,556, 4,376,740, 4,490,601, 3,829,538, 4,252,599, 4,474,604, 4,435,342, 3,742, 585, 4,332,617, 4,386,896, 4,264,641, 4,215,084, 4,069,045, 4,259,270, 3,907,546, 4,028,095, and 3,909,241, and Canadian Pat. No. 941,690 relate to metal, alloy, or ore powders or particles or melts and are different from the present invention in that the present invention relates to sperhical glass particles.

Spherical glass particles are more difficult to form because of the higher viscosity of glass at its melting point. Therefore there is a tendency to form filaments with glass.

U.S. Pat. No. 3,313,608 describes a method for producing spherical glass beads in which electrical and magnetic fields are used to break up a molten glass stream of about 0.15" in diameter. The beads are of relatively large particle size, with the size range being from about 0.005 to about 0.200 inches in diameter.

One prior art method for forming glass beads of relatively small size is by grinding the glass into small particles followed by injecting the particles into a flame to melt the particles and allow surface tension to form the particles into spheres. One disadvantage of this method is the formation of a large number of glass filaments along with the spheres. In order to be recylced in the operation, the filaments must be re-melted which is a costly operation.

Commercial glass beads have a particle size in the range of 10 micrometers to 53 micrometers with an average diameter of 30 micrometers. Such beads are described in an article entitled "Shear Band Formation in Polycarbonate-Glass Bead Composites," by M. E. J. Decker and D. Heikens, Journal of Materials Science 19 (1984) 3271–3275.

Therefore, a process for producing such spheres would be desirable.

SUMMARY OF THE INVENTION

In accordance with one aspect of this invention there is provided a process for producing spherical glass particles. The process involves forming a high velocity stream of molten droplets of glass, directing the stream toward a repellent surface, impacting the molten droplets against the surface to form fragmented portions, and cooling these portions to form a glass powder consisting essentially of particles, the major portion of which are glass spheres.

DETAILED DESCRIPTION OF THE INVENTION

For a better understanding of the present invention, together with other and further objects, advantages, and capabilities thereof, reference is made to the following disclosure and appended claims in connection with the above description of some of the aspects of the invention.

The glasses used in the practice of this invention can be essentially any non-metallic glasses which form an amorphous phase on rapid cooling. The especially preferred glasses of this invention are pyrex, quartz, soda lime, lead silicate, borosilicates, and borates.

In preparing the spherical glass particles of this invention, a high velocity stream of molten droplets of the glass is formed. Such a stream can be formed by any thermal spraying technique such as combustion spraying, and plasma spraying. Typically the velocity of the molten droplets is greater than about 200 meters per second, and more preferably greater than about 250 meters per second. Velocities on the order of about 900 meters per second or greater can be achieved under certain conditions which favor these speeds which may include spraying in a vacuum.

In a preferred process of this invention, a glass powder is fed through a thermal spray apparatus. Feed powder is entrained in a carrier gas which is a non-reducing gas with argon being the preferred gas. Other non-reducing gases which can be used are helium and nitrogen, oxygen, and air.

The entrained particles are then fed into a high temperature zone having a temperature sufficiently above the softening point of the glass to allow surface tension to subsequently spheriodize the particles and having a temperature below the vaporization temperature of the glass.

Details of the principles and operation of plasma reactors are well known. The plasma has a high temperature zone, but in cross section, the temperature can vary from about 5500° C. to about 17,000° C. The outer edges are at low temperatures and the inner part is at a higher temperature. The residence time depends upon where the particles entrained in the carrier gas are injected into the nozzle of the plasma gun. Thus, if the particles are injected into the the outer edge, the residence time must be longer and if they are injected into the inner portion, the residence time is shorter. Thus residence time in the plasma flame can be controlled by choosing the point at which the particles are injected into the plasma. Residence time in the plasma is a function of the thermophysical properties of the plasma gas and the powder material itself for a given set of plasma operating conditions and powder particles. Residence times are generally from about 50 milliseconds to about 100 milliseconds depending on the particle size.

The plasma gas is a non-reducing gas with argon being the preferred gas. Other suitable non-reducing gases are helium and nitrogen.

Preferably the powders utilized for the plasma torch should be uniform in size and composition and relatively free flowing. Flowability is desirable to aid in the transportation and injection of the powder into the plasma flame. In general, fine powders, (less than about 20 to about 30 micrometers) do not exhibit good flow characteristics. A narrow size distribution is desirable because, if the distribution is not sufficiently narrow, under set flame conditions, the largest particles may not melt completely, and the smallest particles may be heated to the vaporization point. Incomplete melting is a detriment to the product uniformity, whereas vaporization and decomposition decreases process efficiency. Typically the size ranges for plasma feed powders are no greater than about 200 micrometers, and preferably from about 30 to about 70 micrometers.

The stream of entrained molten glass droplets which issues from the nozzle tends to expand outwardly so that the density of the droplets in the stream decreases as the distance from the nozzle increases. Prior to impacting the repellent surface, the stream typically passes through a gaseous atmosphere which tends to cool and decrease the velocity of the droplets. As the atmosphere approaches a vacuum, the cooling and velocity loss is diminished. It is desirable that the nozzle be positioned sufficiently close to the repellent surface so that the droplets are in a molten condition during impact. If the nozzle is too far away, the droplets may solidify prior to impact. If the nozzle is too close the droplets may impinge on previously sprayed molten droplets so as to form a pool of molten material or increase the droplet size. It is generally desirable that the stream flow in a radial direction toward the repellent surface if the surface is curved, and in a nozzle direction, if the surface is flat.

The repellent surface is preferably a surface that is not wetted by the molten glass so as to increase the propensity of the material to form droplets on the surface. The wettability and relative surface energy of the molten glass and a surface can be determined by measuring the contact angle between the liquid phase of the molten glass and the surface through the liquid phase. To favor droplet formation it is favorable to have contact angles greater than about 90 degrees. The surfaces are preferably smooth.

The molten droplets are impacted against the surface to form fragmented portions. After impact, the molten fragmented portions solidify to form the powder particles of this invention which have substantially smooth curvilinear surfaces. The major portion of the particles are spherical in shape. The molten fragmented portions can be cooled by contact with the repellent surface or by an atmosphere near the repellent surface. The cooling medium, either repellent surface or atmosphere is preferably below the solidification temperature of the molten glass. When a cooling atmosphere is utilized, the fragmented portion of particles may solidify after bouncing or rebounding off the surface. When the repellent surface is the primary cooling medium, the major quenching may occur on or closely adjacent to the surface.

It is theorized that the particles tend toward sphericity due to the fact that molten fragments on the surface tend to contract to the smallest surface area consistent with volume. It is believed that the high velocity tends to promote fragmentation of the particles. As droplets impact the surface, the component of velocity in the direction of flight is immediately changed to a velocity component in a direction which is parallel to or at a slight angle to the surface. This force tends to promote fragmentation of the droplets.

It is preferable that the rebounding fragmented molten portions and solidified particles have a component of velocity in a given direction normal to the stream direction so as to remove fragmented portions from the path of oncoming droplets. If the nozzle is stationary with respect to the repellent surface, this may be accomplished further by passing an inert gas over the surface at a velocity sufficient to remove fragmented portions. The nozzle or the surface may also be moved relative to each other so as to remove fragmented particles portions from the oncoming stream of entrained particles. To prevent impingement of droplets on fragmented portions, it is desirable that the previously fragmented droplets be passed out of the range of the oncoming droplets.

It is contemplated that a turbulent gaseous medium adjacent to the repellent surface may aid the solidification of rebounding particles.

The resulting spherical particles have a particle size of typically less than about 25 micrometers in diameter, more typically less than about 10 micrometers in diameter, and most typically less than about 1 micrometer in diameter.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for producing spherical glass particles, said process comprising:
   (a) entraining particles of glass in a non-reducing carrier gas;
   (b) forming a high velocity stream of molten droplets of said glass by feeding the entrained particles into a plasma;
   (c) passing said droplets through a gaseous atmosphere to cool and decrease the velocity of said droplets;

(d) directing said stream toward a repellent surface;

(e) impacting said molten droplets against said surface to form fragmented portions; and (f) cooling said fragmented portions to form a glass powder consisting essentially of particles the major portion of which are glass spheres having a particle size of less than about 25 micrometers in diameter.

2. A process of claim 1 wherein said glass is a non-metallic glass which forms an amorphous phase upon rapid cooling.

3. A process of claim 2 wherein said glass is selected from the group consisting of pyrex, quartz, soda lime, lead silicate, and borates.

4. A process of claim 1 wherein said spherical particles have a diameter of less than about 10 micrometers.

5. A process of claim 4 wherein said spherical particles have a diameter of less than about 1 micrometer.

* * * * *